3,427,230
SAPONIFICATION GLYCERINE REFINING BY PLURAL STAGE FLASH DISTILLATION WITH LIVE STEAM
James J. Graham, Wayland, Mass., assignor to Badger Manufacturing Company, Cambridge, Mass., a corporation of Massachusetts
Filed Nov. 9, 1965, Ser. No. 506,923
U.S. Cl. 203—75                        5 Claims
Int. Cl. B01d 3/06

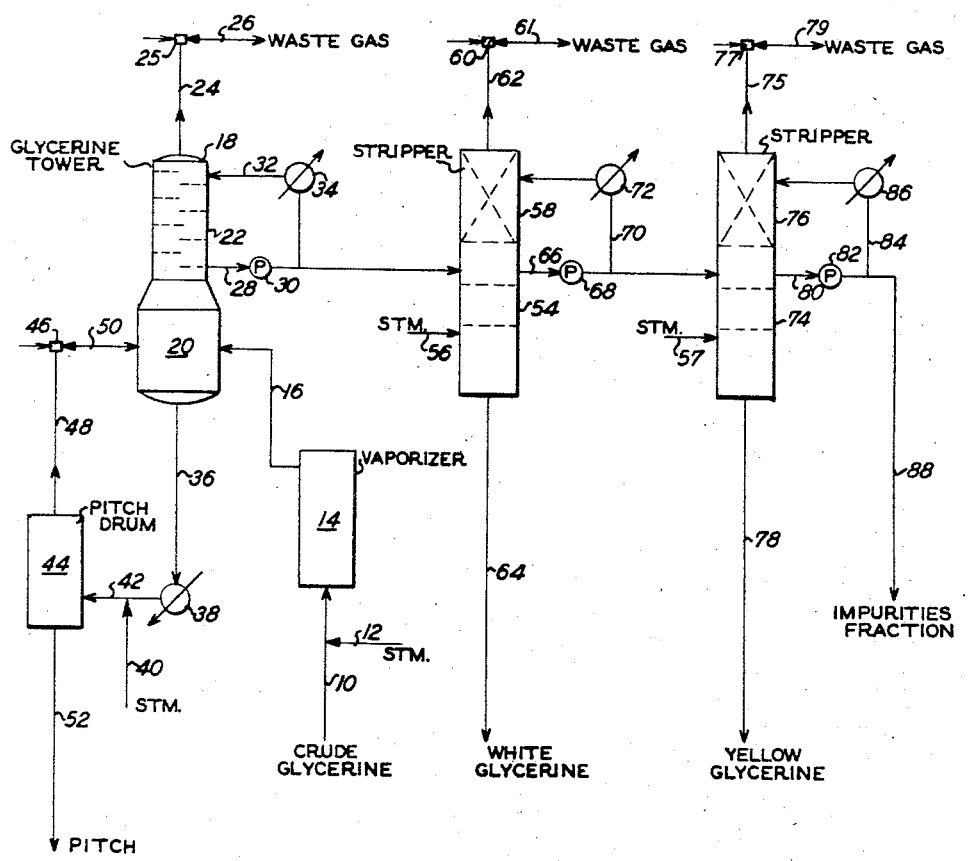

This invention relates to refining of crude glycerine, particularly saponification glycerine derived from fatty acid manufacture, in a continuous flow, low residence purification, economical to separate a superior quality glycerine in high yields.

One feature of this invention is that the glycerine is continuously and highly concentrated to better than 99.5% purity in high yields with a low residence time in a vaporizing tower by direct steam injection into a series of purification stages.

Another feature of the invention is that a substantial quantity of glycerine normally lost in large pitch residues often contained in saponification glycerine, is recovered in greater purity and higher yield by open steam injection directly into a glycerine vaporizer with continuous removal, independent reboiling of the pitch and continuous recovery of glycerine values therefrom.

A further feature of the invention is in the ultimate rapid purification of relatively pure glycerine obtained by steam vaporization preferably effected by direct injection of open steam at the point of vaporization to vaporize and to separately recover in a series of steam injections a pure white glycerine fraction and a yellow glycerine fraction, superior to that commonly available under U.S.P. specifications, in separate fractions of about 99.5 to 99.8% purity, the higher value as a white glycerine and the lower values as a final residual purification product comprising yellow glycerine continuously strippd from impurities.

Still another feature of this invention is in recovery of glycerine from impure saponification glycerine feeds in a continuous substantially single vaporization purification in high yields, exceeding about 95% by a series of steam vaporizations applied in a series of packed tower purifications at reduced pressures to continuously separate impurities which are removed without salting out of inorganic salts or polyglycerines. A consequence is that the glycerine is essentially purified after an initial distillation with steam, and largely it is the impure portions that are redistilled in a continuous stream purification of the liquid to concentrate the glycerine while removing impurities therefrom.

In practicing the present invention, a crude glycerine concentrate of about 90% glycerine is first flash vaporized at sufficiently high temperature of about 300 to 375° F. by direct admixture with superheated steam in a vaporizer, and the vaporous mixture of crude glycerine and steam in continuous flow is flashed into the flash chamber below a grid tower and the glycerine and steam pass upwardly into a packed grid glycerine separating tower maintained under moderate vacuum such as 20 to 100 mm./Hg to miantain the glycerine in liquid phase in a temperature range at the lower end of the packed column of about 300 to 360° F. while vaporizing impurities. Partial pressure also effects vaporization of much of the pitch which separates as bottoms in the tower upon flashing and vapor expansion, but some is carried with the vapors into the packed column of the tower. The upper portion of the grid tower is packed with commercial packing, such as ceramic bodies, which enhances separation of entrained liquid impurities some of which return to the vaporous mixture in the lower flash chamber and are withdrawn with the liquid pitch bottoms. The liquid bottoms are withdrawn together with entrained glycerine values to a pitch reboiler. The pitch bottoms in the reboiler drum is also steam stripped but at a substantially lower pressure to allow recovery, revaporization and return to the glycerine flash tower of vaporized glycerine values recovered from the reboiled pitch.

The substantially purified glycerine condensate separated from the bottom of the bottom of the packed section of the tower is quite concentrated to approximately 98% glycerine which is then passed into a white glycerine stripper where it is again subjected to open steam stripping but at a substantially lower pressure to allow ultimate fractional separation of overhead impurities from highly concentrated 99.8% pure white glycerine bottoms.

The bottoms of that second packed section of the white glycerine stripper is passed to a third packed stripping column from which a concentrated but slightly yellow 99.5% glycerine is obtained as bottoms. In this manner separate grades of white and yellow glycerine are obtained highly concentrated and in high yield in a series of steam strippings.

The invention is further described in conjunction with the drawing which diagrammatically illustrates the process.

Crude 90% saponification glycerine enters the system through line 10 together with high temperature steam through line 12 which comingle to produce a vaporous mixture in a vaporizer 14 at a temperature in the range of about 300 to 375° F., sufficient to vaporize and entrain the glycerine and liquid impurities; entraining some unvaporized pitch droplets. The vapors and entrained liquids are passed by way of line 16 into an enlarged flash expansion and liquid-separating chamber 20 disposed at the lower end of a packed grid glycerine tower 18. Mounted above the flash chamber 20 is a fractionating tower 22 having an overhead outlet duct 24 through which volatile impurities and steam are withdrawn through line 26 by an eductor 25 which controls the pressure in the flash chamber 20 to about the range of 40 to 60 mm./Hg at a temperature of about 335 to 345° F. at the bottom of the tower 22.

The tower 18 may be of conventional construction comprising plates or stages 22 filled with ceramic or carbon packing rings, where by vapors of impurities and steam are fractionally separated from glycerine, the vapors and impurities passing upward and out of line 24 and the liquid glycerine at the lowest stage of the tower is withdrawn through line 28 by pump 30. A portion of the glycerine from line 28 is returned to the top of the packed tower 18 by way of line 32 after being cooled to about 115° F. in condenser 34 serving as a washing reflux to remove further glycerine values from impurity vapors passing upward through the packed column.

The unvaporized pitch droplets and mist separated at the bottom of flash chamber 20 and containing substantial quantities of entrained glycerine values therein is continuously withdrawn from the bottom of the chamber 20 by way of line 36, heated in a heat exchanger 38 to a glycerine vaporizing temperature in the range of 340 to 375° F. and then stripped with open steam entering line 40. The steam and pitch pass through line 42 and are again flashed in the vaporizing pitch drum 44 maintained by eductor 46 at a lower pressure than in chamber 20, such as between 6 and 10 mm./Hg. The glycerine vapor concentrate and steam passing overhead through line 48 through eductor 46 is returned by line 50 to the glycerine separating chamber 20. The liquid pitch is withdrawn from the pitch drum 44 by way of line 52 and is discarded from the system after having the glycerine values removed as described.

The glycerine in line 28 is now passed into the center portion of a white glycerine stripper tower 54 by steam entering through line 56, the bottom of the tower being maintained at a pressure of about 35 to 40 mm./Hg and a corresponding temperature of about 335 to 345° F. The upward passage of steam separates a portion of the glycerine, together with all of the impurities, and the steam and entrained liquids including impurities pass upward again through a packed tower portion 58 maintained by an eductor 60 through line 62 at a lower top pressure of about 8 mm./Hg. Pure white glycerine is withdrawn through the bottom of tower 54 by way of line 64. Impurities and steam pass overhead by way of line 62 and thence out of the system through eductor 60 and waste line 61.

Glycerine values and some impurities as yellow glycerine collect at the bottom of the packed column portion 58 and are withdrawn as yellow glycerine through line 66 by pump 68. A portion of the yellow glycerine is returned by line 70 after being cooled in exchanger 72 to the top of the packed column as a liquid reflux, scrubbing all glycerine values from the ascending steam and entrained impurities passing upward through the packed column.

The yellow glycerine ultimately passes to the center of a second tower 74 by way of line 68, the tower 74 being substantially the same as tower 54 having a packed column portion at the upper end 76 through which other liquid impurities and steam pass overhead through line 75 at reduced pressure maintained by eductor 77 and are discharged through line 79. A yellow glycerine fraction is withdrawn at the bottom of the column through line 78. Liquid impurities are withdrawn through line 80 as impelled by a pump 82, a portion being returned through line 84 as reflux liquid after being cooled in exchanger 86. The remainder of the liquid impurities impelled by pump 82 pass out of the system by way of line 88.

As thus described, the crude glycerine is flashed into vapors with super-heated steam and the glycerine values are continuously separated from the impurities and the superheated steam in a series of packed columns in continuous purification. Steam washed glycerine values are returned to the system. Entrained glycerine is recovered from the pitch wastes. A first glycerine stripper column 54 produces high purity white glycerine and a second stripper column 74 produces a less pure yellow glycerine, both highly concentrated as better than 99.5% glycerine.

The following example illustrates the practice of this invention:

EXAMPLE I

90% glycerine is passed continuously to the bottom of a vaporizer chamber together with super-heated steam and liquid and vapors are passed into flash chamber 20 below a glycerine-separating tower 18, the tower being maintained in a vacuum by a steam eductor 25 such that the bottom conditions of the packed tower 22 and the flash chamber 20, is at a pressure of 50 mm./Hg and the vapors at a temperature of 340° F. A pitch stream is withdrawn and reflashed with steam at a pressure of 8.0 mm./Hg and steam and entrained glycerine values are returned to the flash chamber 20.

The condensed glycerine withdrawn through a line 28 is 98% concentrated. The liquid glycerine is then passed to a glycerine stripper column 54 having a top pressure maintained by eductor 60 of 8.5 mm./Hg, the condition below the packed column being maintained at 40 mm./Hg and a temperature of 340° F. White glycerine is withdrawn through line 64 having a concentration of better than 99.8%. The yellow glycerine accumulating at the bottom of the packed tower 58 is passed by line 66 to the yellow glycerine stripping tower 74, impurities being again stripped by steam entering through line 57. Yellow glycerine bottoms are withdrawn through line 78 and have a purity of 99.5%. In the process described, the white glycerine has a color bleach of 4, whereas in contrast by the Hazen test, U.S. test glycerine has a color of 10. The white glycerine, according to this example is compared to ordinary USP glycerine of commerce in the following table:

|  | Process Described | U.S.P. | Test |
|---|---|---|---|
| Color after bleach | 4 | 10 | Hazen. |
| FAE, ml | 0.25 | 0.5 | U.S.P. |
| Conc., wt. percent | 99.8 | 99.2 |  |
| Odor | (¹) | (²) |  |

¹ Bland, sweet and clean.  ² Characteristic.

The white glycerine produced is far superior both in color, concentration and odor as well as other measurable impurities to that of normal U.S.P. grade of commerce. Moreover, the 99.5% yellow glycerine obtained in this example, too is of superior concentration to that available according to U.S.P. standards.

The present invention using packed towers to continuously separate glycerine from vaporized impurities in a series of direct steam contacts, provides a higher concentration for a purified glycerine in separate fractions of white glycerine and yellow glycerine in continuous flow. Moreover, the use of packing while producing a superior product, eliminates the need for external condensers, the packing serving to enrich as well as remove impurities, while simplifying apparatus structures and costs. Finally, the system is improved both by the economy of continuous operation to produce superior products as well as the economy of rejecting both pitch and other impurities from the system recovering glycerine values in high purity and yield.

Certain modifications will occur to those skilled in the art and, accordingly, it is desired that the description given be regarded as illustrative and not limiting except as defined in the claims appended hereto.

I claim:
1. The method of purifying crude saponification glycerine comprising commingling said crude glycerine with super-heated steam in quantity and at a temperature and pressure to flash the glycerine values and volatile impurities therein into vapors and separate non-volatile impurities and separately condensing the glycerine from said vapors, reflashing the glycerine condensate admixed with a second quantity of live steam to vaporize additional impurities from a liquid purified and concentrated glycerine bottoms product.

2. The method of claim 1 wherein the vaporized components of the second flash treatment are rectified in a distillation column and a yellow glycerine bottoms product of said column is again admixed with live steam and flashed a third time under conditions to remove vaporized impurities and a yellow concentrated and substantially purified liquid yellow glycerine bottoms product of said third flash treatment.

3. The method of purifying saponification glycerine comprising mixing a crude glycerine with live steam at sufficiently raised temperature and at reduced pressure to evaporate the glycerine content of the crude product and the more volatile impurities, flashing the vaporized components of said mixtrue into a first flashing zone communicating with a first distillation column to pass the flashed vapors upward through said column, maintaining said first column under said conditions to separate steam and volatile impurities overhead and liquid glycerine at the lower end of said column, passing the glycerine from the end of said column admixed with additional live steam to a second flash zone communicating with a second distillation column under conditions to vaporize further impurities and impure glycerine vapors upward through said second column, separating white glycerine bottoms of said second flash zone as highly concentrated purified liquid glycerine product, maintaining said second column under conditions to separate steam and volatile impurities overhead and a liquid yellow glycerine product of greater impurity content than the white glycerine near the lower end of said second column, passing said yellow glycerine in admixture with live steam in quantity sufficient to vaporize further impurities to a third flash zone and separating a concentrated purified yellow glycerine bottoms product of said third zone.

4. The method of claim 3 wherein the crude glycerine, obtained by saponification of fats, contains heavier glycerine pitch residues, and the liquid pitch containing bottoms of said first flash zone is withdrawn, contacted at a lower pressure with more live steam and at a temperature sufficient to volatilize any glycerine residues trapped in said pitch bottoms and the mixed steam and glycerine vapors are recycled to said first flash zone.

5. The method of claim 3 wherein at least said first column is a packed column.

References Cited

UNITED STATES PATENTS

| | | | |
|---|---|---|---|
| 1,089,383 | 3/1914 | Wood | 203—79 |
| 1,416,318 | 5/1922 | Barbet | 203—79 |
| 1,626,986 | 5/1927 | Varnes | 203—96 |
| 2,496,576 | 2/1950 | Bradford | 203—87 |
| 2,658,863 | 11/1953 | Guala | 203—79 |
| 2,960,447 | 11/1960 | Anderson et al. | 203—79 |
| 3,278,398 | 10/1963 | Finneran et al. | 203—76 |

WILBUR L. BASCOMB, JR., *Primary Examiner.*

U.S. Cl. X.R.

203—76, 77, 87, 88, 78, 79, 80; 260—637

UNITED STATES PATENT OFFICE
CERTIFICATE OF CORRECTION

Patent No. 3,427,230                            February 11, 1969

James J. Graham

It is certified that error appears in the above identified patent and that said Letters Patent are hereby corrected as shown below:

In the heading to the printed specification, lines 5 to 7, "assignor to Badger Manufacturing Company, Cambridge, Mass., a corporation of Massachusetts" should read -- assignor, by mesne assignments, to The Badger Company, Inc., Cambridge, Mass., a corporation of Delaware --.

Signed and sealed this 12th day of Janaury 1971.

(SEAL)
Attest:

Edward M. Fletcher, Jr.                       WILLIAM E. SCHUYLER, JR.
Attesting Officer                               Commissioner of Patents